United States Patent
Moon et al.

(10) Patent No.: US 12,291,468 B2
(45) Date of Patent: May 6, 2025

(54) WATER PURIFIER

(71) Applicant: COWAY CO., LTD., Chungcheongnam-do (KR)

(72) Inventors: Hyoung-Min Moon, Seoul (KR); Chul-Ho Kim, Seoul (KR); Young-Hoon Hong, Seoul (KR); Si-Jun Park, Seoul (KR); Hyun-Soo Shin, Seoul (KR)

(73) Assignee: COWAY Co., Ltd., Chungcheongnam-do (KR)

( * ) Notice: Subject to any disclaimer, the term of this patent is extended or adjusted under 35 U.S.C. 154(b) by 557 days.

(21) Appl. No.: 17/642,586

(22) PCT Filed: Sep. 21, 2020

(86) PCT No.: PCT/KR2020/012712
§ 371 (c)(1),
(2) Date: Mar. 11, 2022

(87) PCT Pub. No.: WO2021/060785
PCT Pub. Date: Apr. 1, 2021

(65) Prior Publication Data
US 2022/0332605 A1 Oct. 20, 2022

(30) Foreign Application Priority Data
Sep. 23, 2019 (KR) .......... 10-2019-0116884

(51) Int. Cl.
*C02F 1/44* (2023.01)
*B01D 61/12* (2006.01)
*C02F 1/00* (2023.01)

(52) U.S. Cl.
CPC .............. *C02F 1/441* (2013.01); *C02F 1/001* (2013.01); *C02F 2201/005* (2013.01)

(58) Field of Classification Search
CPC .... C02F 1/441; C02F 1/001; C02F 2201/005; C02F 1/003; C02F 1/283; C02F 2201/004;
(Continued)

(56) References Cited

U.S. PATENT DOCUMENTS

2017/0321181 A1* 11/2017 Hazlebeck ............ C12M 41/48
2018/0154310 A1*  6/2018 Huang ................. B01D 61/025
2019/0083934 A1*  3/2019 Moon .................... B01D 61/10

FOREIGN PATENT DOCUMENTS

AU    2016286651 A1    1/2018
CN     200943047 Y     9/2007
(Continued)

OTHER PUBLICATIONS

English translation of JP2015182054A, 9 pages, No Date.*
(Continued)

*Primary Examiner* — Pranav N Patel
(74) *Attorney, Agent, or Firm* — Guntin & Gust, PLC; Miyoung Shin (57) ABSTRACT

A water purifier capable of stably discharging residual water from an extraction unit is disclosed. The water purifier (100) comprises: a filter unit (110) having a reverse osmosis membrane filter (113) for filtering incoming water; an extraction unit (160) for providing purified water filtered by the filter unit (110) to a user; and a residual water drainage unit (150) configured to drain, through the reverse osmosis membrane filter (113), residual water remaining in the extraction unit (160), by using an osmotic phenomenon of the reverse osmosis membrane filter (113) after completion of the extraction through the extraction unit (160).

8 Claims, 6 Drawing Sheets

(58) Field of Classification Search
CPC .............. C02F 2209/40; C02F 2303/22; C02F 2307/10; B01D 61/002; B01D 61/12; B01D 2313/12; B01D 2313/18; B01D 63/08; B01D 61/025; B01D 65/02; B01D 35/153; B01D 35/1573
See application file for complete search history.

(56) References Cited

FOREIGN PATENT DOCUMENTS

| | | |
|---|---|---|
| CN | 205403119 U | 7/2016 |
| CN | 106517422 A | 3/2017 |
| CN | 108467087 A | 8/2018 |
| JP | 2007105572 A | 4/2007 |
| JP | 2015182054 A * | 10/2015 |
| KR | 1020100067830 A | 6/2010 |
| KR | 1020130025801 A | 3/2013 |
| KR | 1020140051542 A | 5/2014 |
| KR | 1020140131614 A | 11/2014 |
| KR | 1020150104377 A | 9/2015 |
| KR | 1020160142478 A | 12/2016 |
| KR | 1020190078762 A | 7/2019 |
| WO | 2017002022 A1 | 1/2017 |
| WO | WO-2017155274 A1 * | 9/2017 ............. B01D 35/14 |

OTHER PUBLICATIONS

Extended European Search Report mailed Sep. 29, 2022 for EP Application No. 20868627.9.
"System Operation: RO & NF System Shutdown", Applied Membranes, Water Treatment Guide: Technical Database for the Water Treatment Industry, 2 Pages.
International Search Report for corresponding International Application No. PCT/KR2020/012712, mailed Dec. 23, 2020, and English Translation, 5 pages.
Chinese Office Action for Counterpart Chinese Application No. CN 202080066426.0, mailed Jan. 26, 2024, 17 pgs.
Chinese Office Action for Counterpart Chinese Application No. CN 202080066426.0, mailed May 9, 2023, 9 pages.

* cited by examiner

WATER PURIFIER

CROSS-REFERENCE OF RELATED APPLICATIONS

The present application is a national stage application under 35 U.S.C. 371 based on International Application No. PCT/KR2020/012712 filed Sep. 21, 2020, which claims priority to Korean Patent Application No. 10-2019-0116884 filed Sep. 23, 2019, the disclosure of which are incorporated by reference as if fully set forth herein.

TECHNICAL FIELD

The present disclosure relates to a water purifier including a reverse osmosis membrane filter, and more particularly, a water purifier based on reverse osmosis which may discharge residual water remaining in an extraction unit.

BACKGROUND ART

A water purifier may be a device for supplying drinking water to a user by filtering water flowing in through one or more filters and discharging the water externally.

Such a water purifier may provide purified water to a user through an extraction unit including a cock or a faucet.

However, in a conventional water purifier, when an extraction valve provided in the extraction unit including a cock, a faucet, or the like is closed after extraction of purified water is completed, residual water may remain in the extraction unit. Residual water remaining between the extraction valve and the extraction unit may be exposed to an external space, and may accordingly become a major factor of contamination such as moss, scale, and bacteria in the extraction unit.

As such, contaminated residual water may contaminate an internal portion of the extraction unit, and also, as residual water may be extracted together with purified water newly supplied as the extraction unit is opened, purified water containing the contaminated residual water may be provided to a user, which may be problematic.

To remove the residual water, a technique of installing a drainage valve in a drainage flow path connected to an extraction unit and an extraction valve and opening the extraction valve and the drainage valve after extraction is complete, and discharging the residual water from the extraction section through the drainage flow path has been suggested.

However, in the case of the prior art, discharge of residual water may not be smooth due to path resistance due to a drainage flow path and a non-return valve installed therein. Particularly, when a length of the drainage flow path, that is, a length from a connection portion on the extraction unit side to a final outlet is long, most of residual water may not be discharged.

PRIOR ART

Reference (Reference 1) KR2015-0104377 A
(Reference 2) KR2016-0142478 A

DISCLOSURE

Technical Problem

The present disclosure has been derived to address at least a portion of problems of the prior art as above, and the purpose of the present disclosure is to provide a water purifier which may stably discharge residual water in an extraction unit.

Also, an aspect of the present disclosure is to provide a water purifier which may naturally discharge residual water in an extraction unit without using a power source by switching a flow path through a valve when extraction is finished.

Technical Solution

According to an aspect of the present disclosure, the present disclosure provides a water purifier including a filter unit including a reverse osmosis membrane filter configured to filter incoming water; an extraction unit configured to provide purified water filtered by the filter unit to a user; and a residual water drainage unit configured to, after extraction through the extraction unit is finished, drain residual water remaining in the extraction unit through the reverse osmosis membrane filter using an osmotic phenomenon of the reverse osmosis membrane filter.

A purified water discharge flow path through which purified water filtered by the reverse osmosis membrane filter is discharged, and a drainage flow path through which concentrated water not filtered by the reverse osmosis membrane filter is discharged are connected to a rear end of the reverse osmosis membrane filter, the residual water drainage unit includes a residual water drainage flow path connecting the extraction unit to the purified water discharge flow path, and the residual water in the extraction unit flows into the reverse osmosis membrane filter through the residual water drainage flow path and the purified water discharge flow path by an osmosis phenomenon of the reverse osmosis membrane filter, and is drained through the drainage flow path.

The extraction unit may be connected to an extraction valve for extracting purified water, and the residual water drainage flow path may connect the extraction valve to the purified water discharge flow path.

The extraction valve may be configured to operate to connect the extraction unit to the residual water drainage flow path when the residual water is drained.

The residual water drainage unit may further include a residual water drainage valve installed in the residual water drainage flow path and opened during an operation of draining the residual water.

The residual water drainage valve may be configured to be opened for a predetermined operation time to discharge the residual water.

The residual water drainage valve may be configured to open after a predetermined standby time is elapsed after extraction of the extraction unit is finished.

The residual water drainage unit may further include a non-return valve installed in the residual water drainage flow path and configured to prevent backflow of water from the purified water discharge flow path in a direction of the extraction unit.

The drainage flow path may include a concentrated water flow path through which concentrated water not filtered by the reverse osmosis membrane filter is discharged, and a flushing flow path for flushing the reverse osmosis membrane filter, and a flushing valve configured to open the flushing flow path when the reverse osmosis membrane filter is flushed may be installed in the flushing flow path.

The flushing valve may be configured to be open when the residual water is drained.

Advantageous Effects

According to an embodiment of the present disclosure, an effect of stably discharging residual water from an extraction unit using an osmosis phenomenon of a reverse osmosis membrane filter may be obtained.

Also, according to an embodiment of the present disclosure, an effect in which, by using an osmosis phenomenon of a reverse osmosis membrane filter, residual water in an extraction unit may be discharged naturally without using a power source by switching a flow path through a valve when extraction is finished may be obtained.

DESCRIPTION OF REFERENCE NUMERALS

100 . . . WATER PURIFIER, 110 . . . FILTER UNIT, 111 . . . PRE-TREATMENT FILTER,
113 . . . REVERSE OSMOSIS MEMBRANE FILTER, 115 . . . POST-TREATMENT FILTER, 120 . . . PRESSURIZATION UNIT
130 . . . COLD WATER GENERATION UNIT, 140 . . . HOT WATER GENERATION UNIT, 150 . . . RESIDUAL WATER DRAINAGE UNIT
151 . . . RESIDUAL WATER DRAINAGE FLOW PATH, 155 . . . RESIDUAL WATER DRAINAGE VALVE, 157 . . . NON-RETURN VALVE
160 . . . EXTRACTION UNIT, CP1, CP2 . . . CONNECTION PORT, FS1, FS2 . . . FLOW RATE SENSOR
L1 . . . FIRST FLOW PATH, L2 . . . SECOND FLOW PATH, L3 . . . THIRD FLOW PATH (PURIFIED WATER DISCHARGE FLOW PATH)
L4 . . . FOURTH FLOW PATH, L5 . . . FIFTH FLOW PATH, L6 . . . PURIFIED WATER FLOW PATH, L7 . . . COLD WATER FLOW PATH
L8 . . . HOT WATER FLOW PATH, L9 . . . EXTRACTION FLOW PATH, LD . . . DRAINAGE FLOW PATH,
LF . . . FLUSHING FLOW PATH, LL . . . CONCENTRATED WATER FLOW PATH, M . . . FLOW PATH BRANCH UNIT
MB . . . REVERSE OSMOSIS MEMBRANE, S1 . . . FILTRATION SIDE, S2 . . . NON-FILTRATION SIDE, V1 . . . FEED VALVE
V2 . . . WATER SUPPLY VALVE, V3 . . . COLD WATER SUPPLY VALVE, V4 . . . HOT WATER SUPPLY VALVE
V5 . . . EXTRACTION VALVE, VC1, VC2 . . . NON-RETURN VALVE, VF . . . FLUSHING VALVE
VL . . . RESISTANCE VALVE, VR . . . RESISTANCE VALVE, VR1 . . . REGULATOR
VR2 . . . PRESSURE REDUCING VALVE, VT . . . SHUT-OFF VALVE

Best Mode for Invention

Hereinafter, preferable embodiments of the present disclosure will be described with reference to the accompanying drawings. However, the embodiments of the present disclosure may be modified in various other forms, and the scope of the present disclosure is not limited to the embodiments described below. Also, the embodiments of the present disclosure are provided to describe the present disclosure more completely to a person having ordinary skill in the art. The shapes and sizes of the elements in the drawings may be exaggerated for clearer description.

Also, in the present specification, a singular term may include a plural form unless otherwise indicated, and the same reference numerals refer to the same element or a corresponding element throughout the embodiments.

In the description below, the embodiments of the present disclosure will be described with reference to the drawings.

Figure 1:
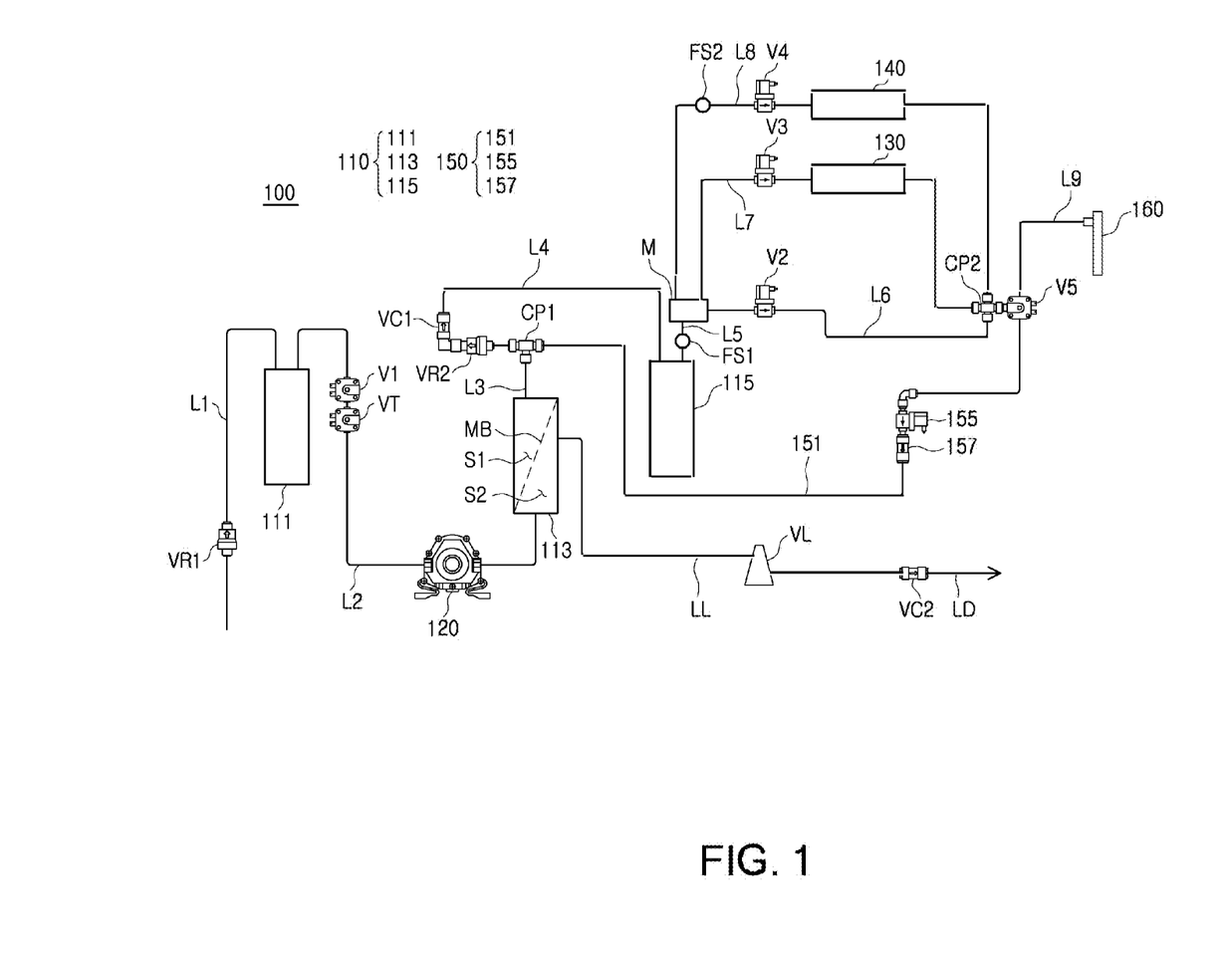
FIG. 1 is a water-pipe diagram of a water purifier according to an embodiment of the present disclosure.
Figure 2:
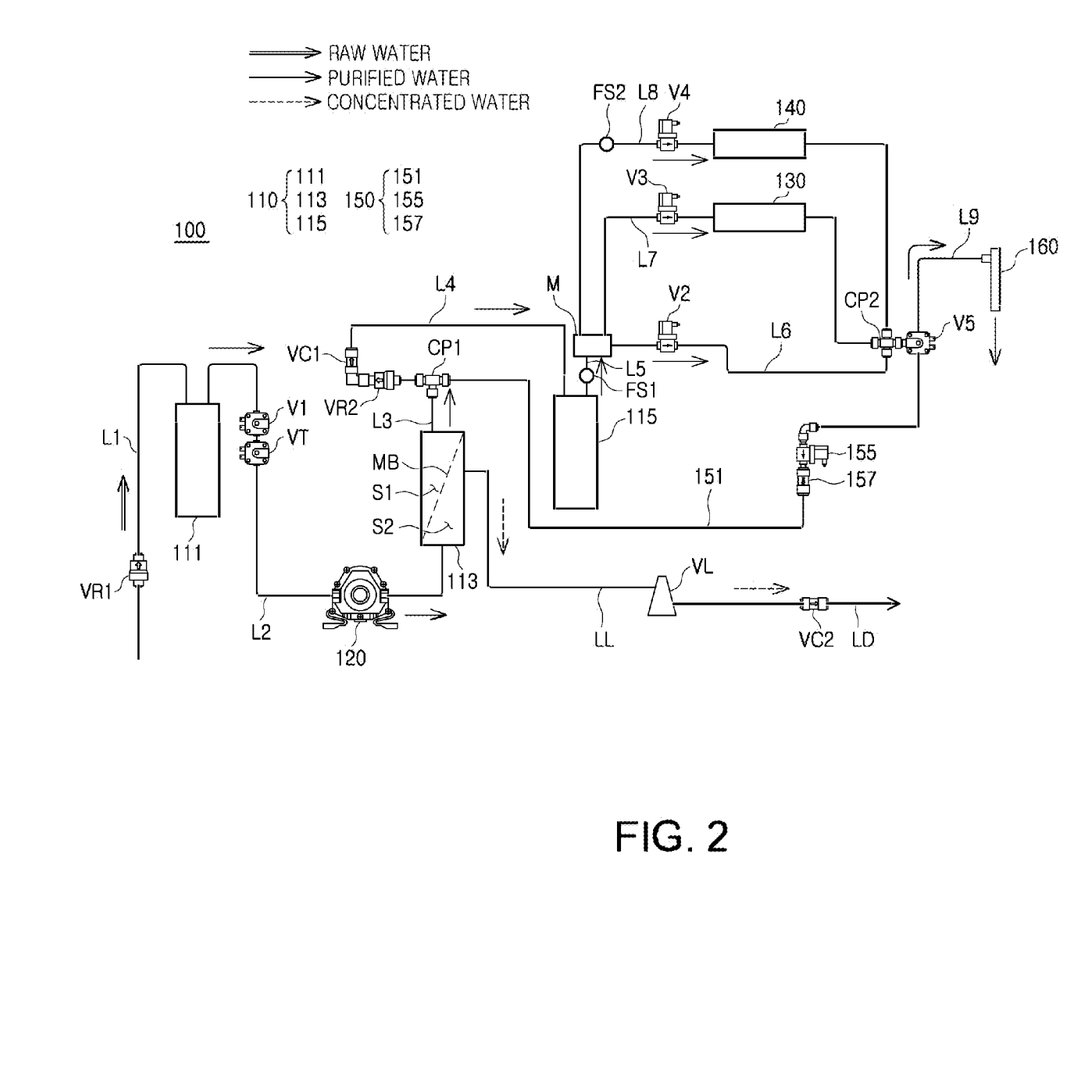
FIG. 2 is a water-pipe diagram illustrating a water flow in extraction of purified water of the water purifier illustrated in FIG. 1.
Figure 3:
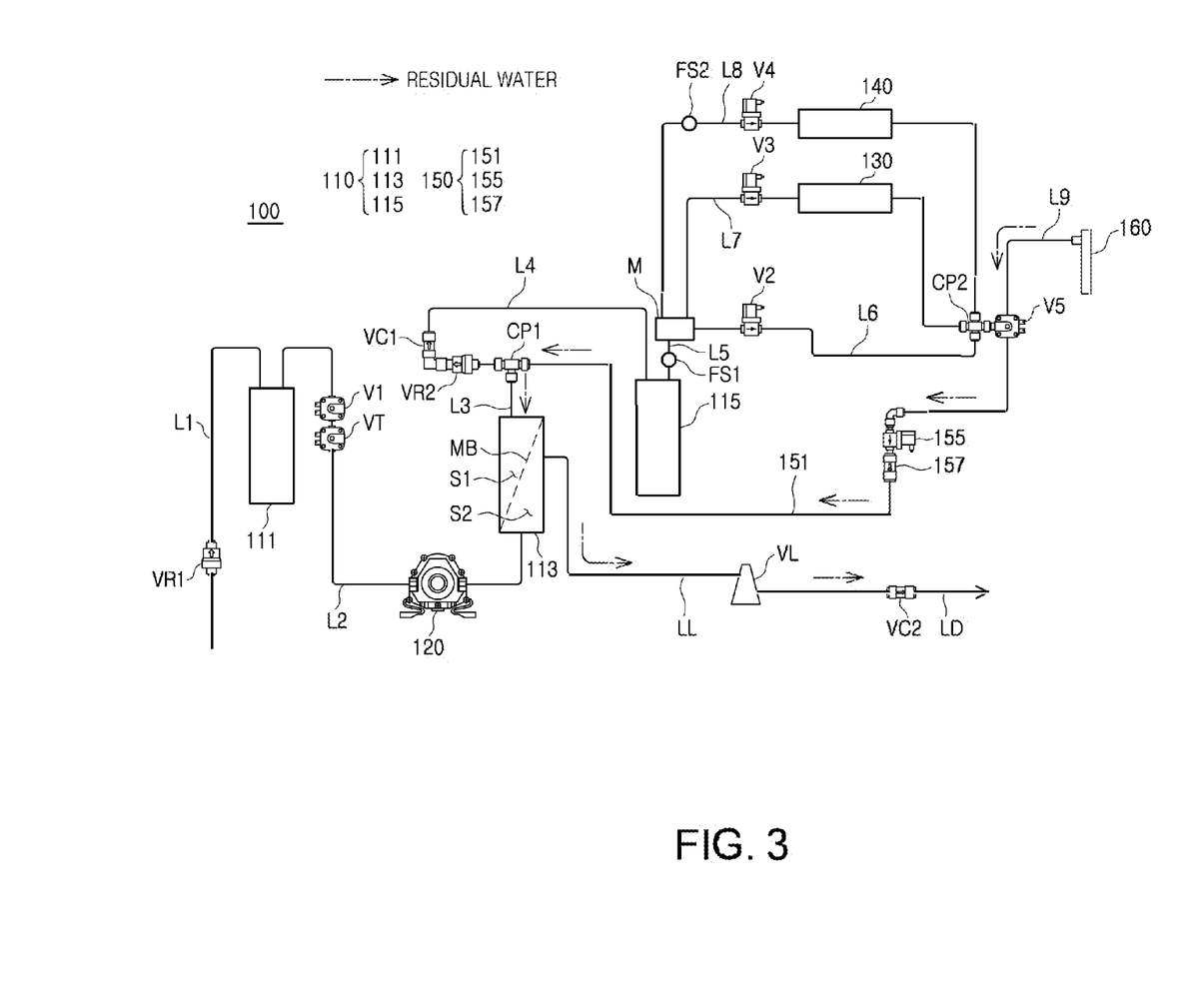
FIG. 3 is a water-pipe diagram illustrating a water flow in a case of draining residual water in an extraction unit in the water purifier illustrated in FIG. 1.
Figure 4:
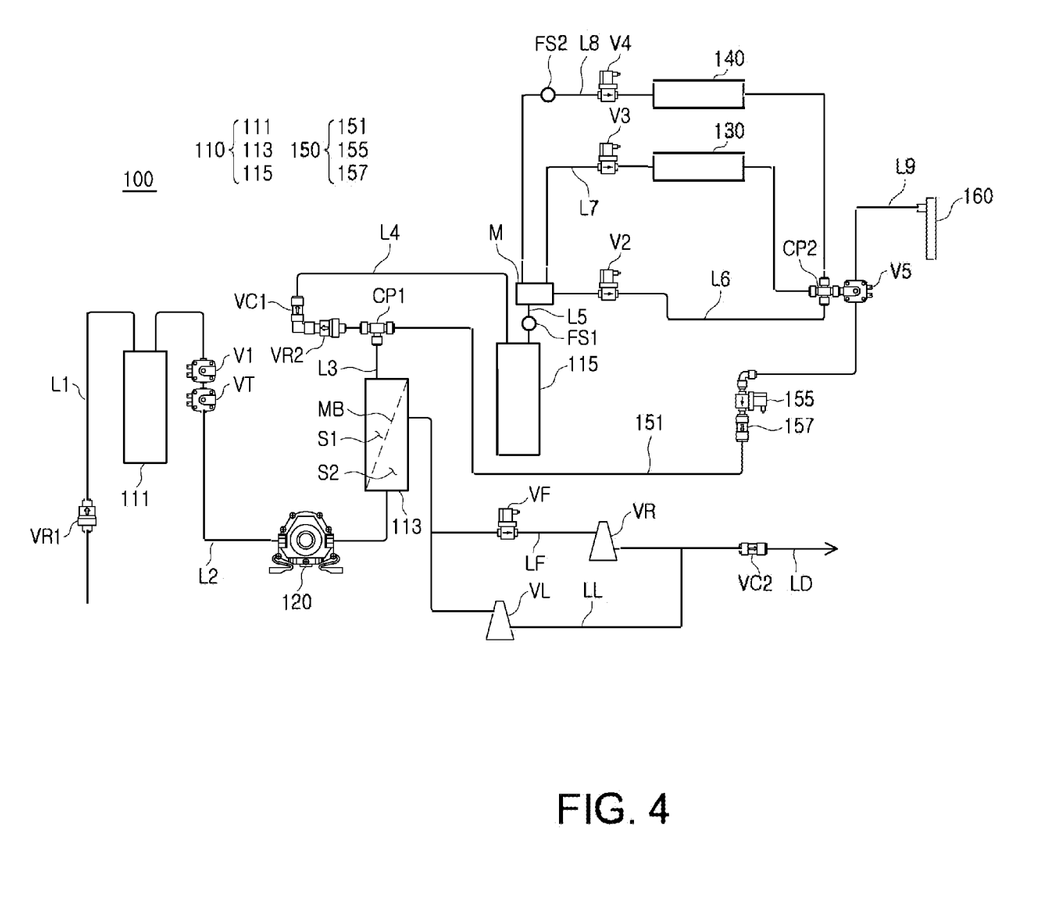
FIG. 4 is a water-pipe diagram illustrating a water purifier according to another embodiment of the present disclosure.
Figure 5:
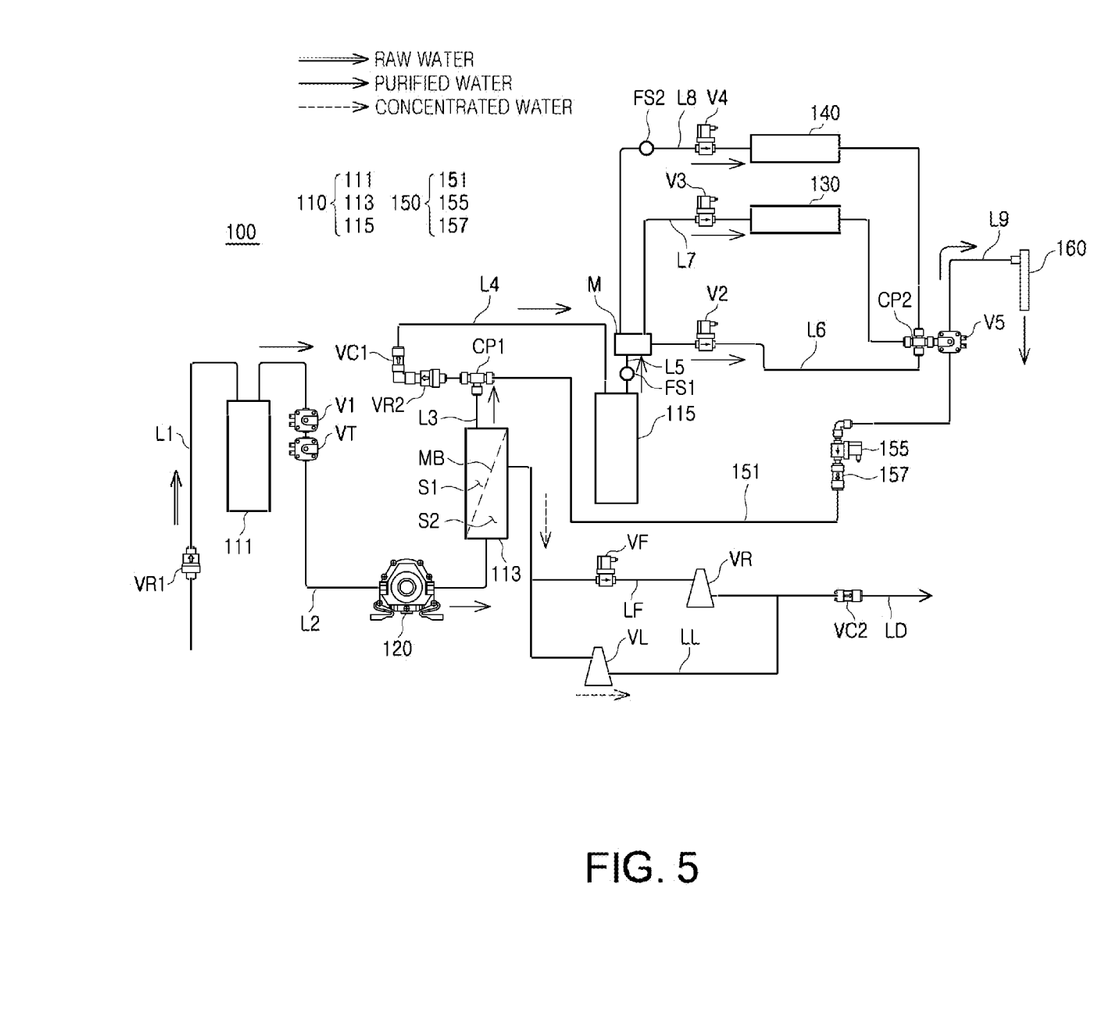
FIG. 5 is a water-pipe diagram illustrating a water flow in extraction of purified water of the water purifier illustrated in FIG. 4.
Figure 6:
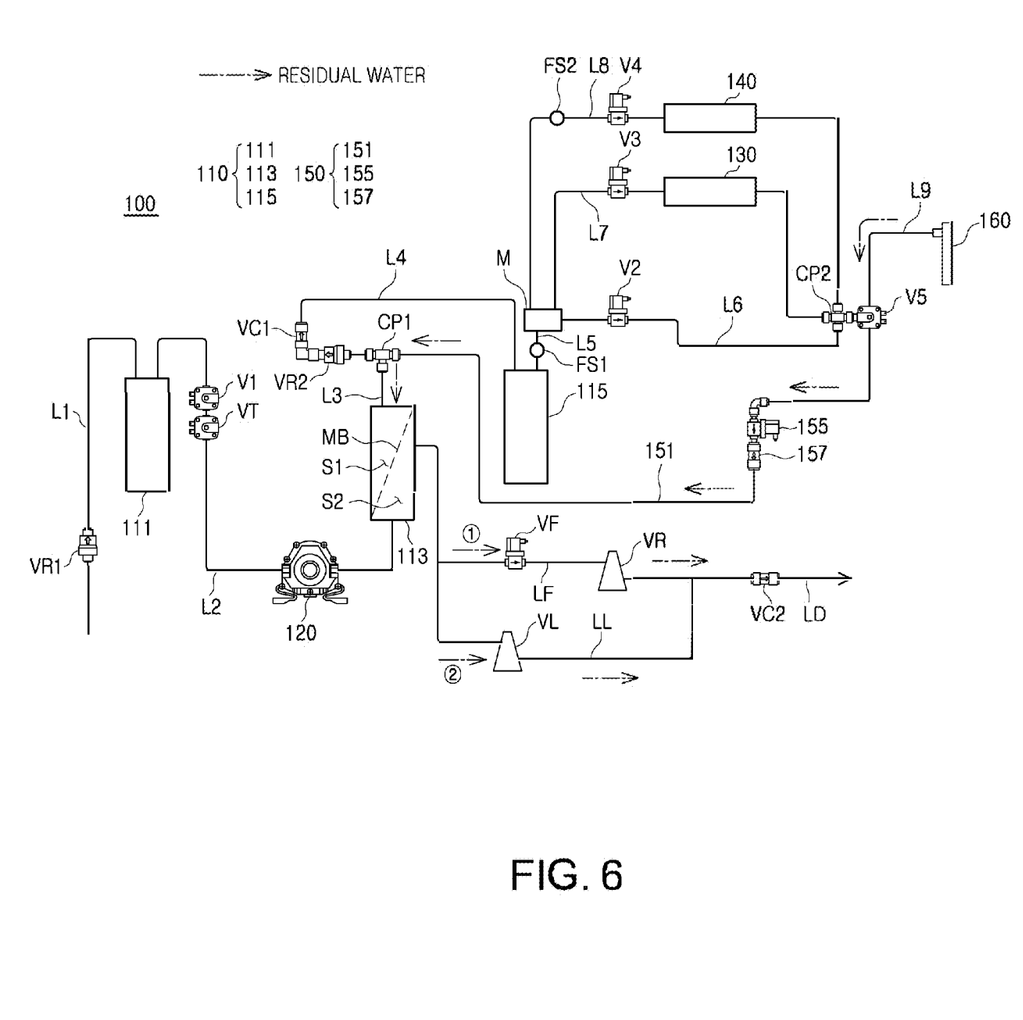
FIG. 6 is a water-pipe diagram illustrating a water flow in a case of draining residual water of an extraction unit in the water purifier illustrated in FIG. 4.

FIG. 1 is a water-pipe diagram of a water purifier 100 according to an embodiment of the present disclosure, FIG. 2 is a water-pipe diagram illustrating a water flow in extraction of purified water of the water purifier 100 illustrated in FIG. 1, FIG. 3 is a water-pipe diagram illustrating a water flow in a case of draining residual water in an extraction unit 160 in the water purifier 100 illustrated in FIG. 1, FIG. 4 is a water-pipe diagram illustrating a water purifier 100 according to another embodiment of the present disclosure, FIG. 5 is a water-pipe diagram illustrating a water flow in extraction of purified water of the water purifier 100 illustrated in FIG. 4, and FIG. 6 is a water-pipe diagram illustrating a water flow in a case of draining residual water of an extraction unit 160 in the water purifier 100 illustrated in FIG. 4.

Referring to FIGS. 1 to 6, the water purifier 100 according to an embodiment of the present disclosure may be configured to include a filter unit 110, an extraction unit 160, and a residual water drainage unit 150, and may be configured to further include a pressurization unit 120, a cold water generation unit 130, a hot water generation unit 140, and a plurality of flow paths and valves connected thereto.

First, the filter unit 110 may include at least one filter including a reverse osmosis membrane filter 113 to filter incoming water and to generate purified water.

For example, as illustrated in FIGS. 1 to 6, the filter unit 110 may include three filters including a pre-treatment filter 111, a reverse osmosis membrane filter 113, and a post-treatment filter 115.

In this case, the pre-treatment filter 111 may be configured as a composite filter of a sediment filter and a pre-carbon filter, for example, and the post-treatment filter 115 may be configured as a post-carbon filter, for example. However, the type and number of filters included in the pre-treatment filter 111 and the post-treatment filter 115 are not limited thereto.

Also, the reverse osmosis membrane filter 113 may filter water flowing in through the pre-treatment filter 111 as illustrated in FIGS. 1 to 6. A reverse osmosis membrane MB configured as a semi-permeable membrane may be provided in the reverse osmosis membrane filter 113 and may partition an internal space of the reverse osmosis membrane filter 113 into a filtration side S1 and a non-filtration side S2.

The reverse osmosis membrane filter 113 may be configured to purify water using a reverse osmosis phenomenon (the opposite to an osmosis phenomenon) in which water may move from the non-filtration side S2 of high concentration to the filtration side S1 of low concentration by applying pressure higher than osmotic pressure to the reverse osmosis membrane MB.

That is, the water flowing into the reverse osmosis membrane filter 113 may be filtered while moving in a direction from the non-filtration side S2 to the filtration side S1, and purified water which has pass through the reverse osmosis membrane MB may be accommodated in the filtration side S1, and water (concentrated water) including foreign substances in high concentration may be accommodated in the non-filtration side S2 as the water has not been able to pass through the reverse osmosis membrane MB. Also, a purified water discharge flow path L3 (third flow path) through which purified water filtered by the reverse osmosis membrane filter 113 is discharged may be connected to the filtration side S1 of the reverse osmosis membrane filter 113, and a drainage flow path LD through which concentrated water not filtered by the reverse osmosis membrane filter 113 is discharged may be connected to the non-filtration side S2 of the reverse osmosis membrane filter 113. The drainage flow path LD will be described later.

Also, the number and types of filters provided in the filter unit 110 are not limited to the aforementioned embodiment. For example, an antibacterial filter or various functional filters may be added.

Meanwhile, as illustrated in FIGS. 1 to 6, a plurality of flow paths may be formed in the water purifier 100 including the filter unit 110 to filter water and to install various components.

For example, raw water may be supplied to the pre-treatment filter 111 through a first flow path L1, and purified water filtered by the pre-treatment filter 111 may pass through the pressurization unit 120 through a second flow path L2 and may be supplied to the reverse osmosis membrane filter 113. In this case, a regulator VR1 for adjusting raw water by a certain amount of pressure may be installed in the first flow path L1.

Also, a feed valve V1 turned on and off to supply or to cut off the supply of water to the filter unit 110 may be provided, and the feed valve V1 may be provided on a front end of the pressurization unit 120, and may be installed in, for example, the second flow path L2.

Meanwhile, as sufficient filtration may not be performed in the reverse osmosis membrane filter 113 simply by the pressure of raw water, the pressurization unit 120 may be provided to pressurize the water supplied to the reverse osmosis membrane filter 113. That is, the pressurization unit 120 may be driven when purified water is generated and may supply water having a pressure sufficient to implement the reverse osmosis phenomenon to the reverse osmosis membrane filter 113.

This pressurization unit 120 may be installed in the second flow path L2 between a rear end of the pre-treatment filter 111 and a front end of the reverse osmosis membrane filter 113, for example, but the position of the flow path on the front end of the reverse osmosis membrane filter 113 may not be limited. Also, the pressurization unit 120 may be configured as, for example, a pump.

Also, a shut-off valve VT may be installed in the flow path on the front end of the pressurization unit 120. The shut-off valve VT may be a normal open valve which may be opened when not in operation and the shut-off valve VT may be closed during operation. For example, the shut-off valve VT may be opened when electricity is not applied and the shut-off valve VT may be closed when electricity is applied. Accordingly, the shut-off valve VT may be open in normal times in non-operation when electricity is not applied. Also, in the event of an accident such as a power outage or malfunctioning of the pressurization unit 120, electricity may be applied to the shut-off valve VT from an emergency power source (not illustrated), or the like, and the shut-off valve VT may operate such that the shut-off valve VT may be closed. Accordingly, in the event of an accident or malfunctioning, water from a water supply source may be blocked from flowing into the filter unit 110 by the shut-off valve VT.

Also, purified water filtered by the reverse osmosis membrane filter 113 may be supplied to the post-treatment filter 115 through the purified water discharge flow path L3 (third flow path) and a fourth flow path L4. In this case, a pressure reducing valve VR2 for reducing the pressure of flowing water to a certain level, and a non-return valve VC1 for preventing a reverse flow of water toward the reverse osmosis membrane filter 113 may be installed in the flow path between the reverse osmosis membrane filter 113 and the post-treatment filter 115.

Also, concentrated water (residential water) which has not passed through the reverse osmosis membrane filter 113 may be discharged through a drainage flow path LD.

As illustrated in FIGS. 1 to 3, the drainage flow path LD may include a concentrated water flow path LL through which concentrated water not filtered by the reverse osmosis membrane filter 113 is discharged. In this case, a resistance valve VL may be installed in the concentrated water flow path LL to limit the amount or a ratio of concentrated water drained through the concentrated water flow path LL (a ratio of water discharged as purified water and water discharged as concentrated water in water flowing into the reverse osmosis membrane filter). That is, filtration pressure may be formed in the reverse osmosis membrane filter 113 by a small flow path diameter of the resistance valve VL, and through this, a portion of water may be filtered through the membrane MB of the reverse osmosis membrane filter 113, and the remaining water may be concentrated water and may be drained.

Differently from this, in addition to the concentrated water flow path LL through which the concentrated water not filtered by the reverse osmosis membrane filter 113 is discharged, the drainage flow path LD may further include a flushing flow path LF which may be mainly used to flush (wash) the reverse osmosis membrane filter 113 by supplying water to the reverse osmosis membrane filter 113 in a direction opposite to the direction in purification, as illustrated in FIGS. 4 to 6.

The flushing flow path LF may be formed as a flow path branching between the rear end of the reverse osmosis membrane filter 113 and the front end of the resistance valve VL, and a flushing valve VF configured to open and close the flushing flow path LF may be installed in the flushing flow path LF. Also, a resistance valve VR may be installed in the flushing flow path LF to limit the amount or a ratio of water drained through the flushing flow path LF.

The flushing valve VF may be configured to be opened by a controller (not illustrated) when the reverse osmosis membrane filter 113 is flushed so as to facilitate drainage through the drainage flow path LD. When the flushing valve VF is opened as above (see FIG. 6), both the concentrated water flow path LL and the flushing flow path LF may be in an open state, such that the total amount of drainage through the drainage flow path LD may increase.

Also, the flushing valve VF may be opened to prevent an excessive load is applied to the pressurization unit 120. For example, as described later, when the hot water generation unit 140 is configured as an instantaneous heating device, and water is heated while flowing through an internal flow path of the instantaneous heating device and hot water is extracted, the amount of flow may decrease further than that of purified water extraction or cold water extraction, In consideration of this, the flushing valve VF may be opened to prevent overload of the pressurization unit 120 when hot water is extracted. Also, as described later, even when the residual water of the extraction unit 160 is drained, the flushing valve VF may be opened to smoothly drain the residual water (see FIG. 6).

Also, a non-return valve VC2 for preventing water from flowing backward toward the reverse osmosis membrane filter 113 side may be installed on an end of the drainage flow path LD.

Also, purified water filtered by the post-treatment filter 115 may be supplied to a flow path branch unit M through a fifth flow path L5, and may be supplied to a purified water flow path L6, a cold water flow path L7, and a hot water flow path L8 branched from the flow path branch unit M. In this case, a flow rate sensor FS1 may be installed in the fifth flow path L5 to detect a flow rate of water supplied to the flow path branch unit M.

A purified water supply valve V2 may be installed in the purified water flow path L6, and when purified water of room temperature is extracted, the purified water supply valve V2 may be opened. Also, the cold water supply valve V3 and the cold water generation unit 130 may be installed in the cold water flow path L7, and when cold water is extracted, the cold water supply valve V3 may be opened. Also, the hot water supply valve V4 and the hot water generation unit 140 may be installed in the hot water flow path L8, and when hot water is extracted, the hot water supply valve V4 may be opened.

Also, the purified water of room temperature supplied from the purified water flow path L6, the cold water supplied from the cold water flow path L7, and the hot water supplied from the hot water flow path L8 may flow into an extraction flow path L9 as the extraction valve V5 is opened, and may be provided to a user through the extraction unit 160. The extraction unit 160 may be configured to provide purified water filtered by the filter unit 110 to a user, and may include a cock or a faucet. Also, the purified water flow path L6, the cold water flow path L7, and the hot water flow path L8 may be connected to the extraction valve V5 through a connection port CP2.

Meanwhile, the cold water generation unit 130 provided in the cold water flow path L7 may be configured as a cold water generation device based on ice heat storage in which purified water filtered by the filter unit 110 may pass through a cold water flow pipe disposed in the ice heat storage tank and may exchange heat with stored iced water in the ice heat storage tank to generate cold water. However, the cold water generation unit 130 is not limited thereto, and may be configured as a water storage-type cold water generation device which may directly cool water accommodated in a cold water tank by a cooling device.

Also, the hot water generation unit 140 provided in the hot water flow path L8 may be configured as an instantaneous heating device for supplying hot water to a user by heating purified water passing through the flow path. In this case, the hot water flow path L8 may include a flow rate sensor FS2 for measuring the amount of water flowing into the hot water generation unit 140 so as to control heating capacity of the hot water generation unit 140. However, the hot water generation unit 140 provided in the hot water flow path L8 is not limited to the instantaneous heating device described above, and a hot water storage-type hot water tank having a heating device may be used.

Finally, a residual water drainage unit 150 may allow the residual water remaining in the extraction unit 160 to be drained through the reverse osmosis membrane filter 113 using an osmosis phenomenon of the reverse osmosis membrane filter 113 after extraction through the extraction unit 160 is finished.

The residual water drainage unit 150 may include a residual water drainage flow path 151 connecting the extraction unit 160 to the purified water discharge flow path L3 (the third flow path), and accordingly, the residual water in the extraction unit 160 may pass through the residual water drainage flow path 151 and the purified water discharge flow path L3, may flow into the reverse osmosis membrane filter 113, and may be drained through the drainage flow path LD by an osmosis phenomenon of the reverse osmosis membrane filter 113.

Specifically, in the process of extraction through the extraction unit 160, a reverse osmosis phenomenon may occur in the reverse osmosis membrane filter 113 by the pressure of the pressurization unit 120, and water may pass through the reverse osmosis membrane MB from the non-filtration side S2 and may move to the filtration side S1, and foreign substances may remain on the non-filtration side S2 and the water may become concentrated water, and accordingly, the concentration of foreign substances (solute) on the non-filtration side S2 may be higher than the concentration of the filtration side S1.

However, when the extraction through the extraction unit 160 is finished, the pressure unit 120 may stop, such that pressure artificially applied to the reverse osmosis membrane filter 113 may be removed, which may cause an osmosis phenomenon in the reverse osmosis membrane filter 113. That is, since the concentration of foreign substances (solute) on the non-filtration side S2 is higher than the concentration of foreign substances on the filtration side S1, water may move from the filtration side S1 of the low concentration to the non-filtration side S2 of the high concentration, such that a suction force may be generated in a direction from the filtration side S1 to the non-filtration side S2. As such, the suction force generated in the osmosis phenomenon may be sufficiently great to discharge the residual water remaining in the extraction unit 160 through the drainage flow path LD.

Also, as the residual water drainage flow path 151 is connected to the purified water discharge flow path L3 (third flow path) through the connection port CP1, and the residual water drainage flow path 151 is connected to the extraction unit 160, the residual water of the extraction unit 160 may pass through the residual water drainage flow path 151 and the purified water discharge flow path L3 and may flow into the filtration side S1 of the reverse osmosis membrane filter 113, and water on the filtration side S1 may move to the non-filtration side S2 by an osmosis phenomenon and may be discharged to the drainage flow path LD.

Also, as described above, the extraction unit 160 may include an extraction valve V5 for extraction of purified water, and the residual drainage flow path 151 may be connected to the extraction unit 160 through the extraction valve V5. Accordingly, the extraction valve V5 may operate by a controller (not illustrated) such that the extraction unit 160 and the residual water drainage flow path 151 may be connected to each other when the residual water is drained.

Meanwhile, in FIGS. 1 to 6, the extraction valve V5 is configured as a single valve, but the extraction valve V5 provided in the water purifier 100 according to the present disclosure may be configured to include a plurality of unit valves in a complex manner to perform a function of extracting purified water and a connection function between the extraction unit 160 and the residual water drainage flow path 151. For example, the extraction valve V5 may include a flow path switching valve and a normal open valve for extracting purified water in a complex manner, or may include an opening and closing valve and a flow path switching valve in a complex manner. As above, the number of unit valve included in the extraction valve V5 provided in the water purifier 100 according to the present disclosure and a specific structure thereof may not be limited and may be varied as along as the extraction valve V5 may perform the extraction function through the extraction unit 160 and the function of connection between the extraction unit 160 and the residual water drainage flow path 151.

The residual water drainage unit 160 may further include a residual water drainage valve 155 installed in the residual water drainage flow path 151 and opened during an operation of draining the residual water. As the residual water drainage valve 155 is opened to allow the residual water to move through the residual water drainage flow path 151, the osmosis phenomenon in the reverse osmosis membrane filter 113 may be controlled by controlling the opening and closing of the residual water drainage valve 155.

Specifically, when the extraction unit 160 and the residual water drainage flow path 151 are connected to each other through the extraction valve V5 and the residual water drainage valve 155 is opened after the extraction of the extraction unit 160 is finished, the residual water in the extraction unit 160 may be drained through the drainage flow path LD by an osmotic phenomenon of the reverse osmosis membrane filter 113. In this case, in the case in which the residual water drainage valve 155 maintains an open state after the discharge of the residual water from the extraction unit 160 is finished, external contaminants may flow into the residual water drainage flow path 151 and the reverse osmosis membrane filter 113 through the extraction unit 160. Therefore, the residual water drainage valve 155 may be controlled by the controller to be opened only for a predetermined operation time to discharge the residual water, and in this case, the operation time may be configured to be sufficient time for the residual water to be discharged by the extraction unit 160.

Meanwhile, there may be a case in which the extraction unit 160 may be used immediately or may be repeatedly used within a predetermined period of time after the extraction in the extraction unit 160 is finished. As such, in the case in which the extraction unit 160 is repeatedly or frequently used, the time for which the residual water remains in the extraction unit 160 may be short such that the possibility of contamination may be low, the drainage of the residual water through the residual water drainage unit 150 may be performed after a predetermined period of time has elapsed after the extraction of the extraction unit 160 is finished. To this end, the controller (not illustrated) may control the opening and closing of the residual water drainage valve 155 such that the residual water drainage valve 155 may be opened after a predetermined standby time is elapsed after the extraction of the extractor 160 is finished.

Also, the residual water drainage unit 160 may further include a non-return valve 157 installed in the residual water drainage flow path 151 and configured to prevent the reverse flow of water in a direction from the purified water discharge flow path L3 toward the extraction unit 160. The non-return valve 157 may prevent purified water discharged from the reverse osmosis membrane filter 113 from moving to the extraction unit 160 through the residual water drainage flow path 151 when the purified water is extracted.

Meanwhile, as described above, in the case of the embodiment illustrated in FIGS. 4 to 6, the drainage flow path LD may include a flushing flow path LF including the flushing valve VF installed therein to flush the reverse osmosis membrane filter 113 in addition to the concentrated water flow path LL through which concentrated water not filtered in the reverse osmosis membrane filter 113 is discharged. In this case, to facilitate the discharge of the residual water from the extraction unit 160, the flushing valve VF may be opened when the residual water is drained, such that the residual water may be drained through the concentrated water flow path LL and the flushing flow path LF.

In the description below, a flow of water in each operating state of the water purifier 100 will be described with reference to FIGS. 2, 3, 5 and 6.

First, the flow of water during extraction of purified water, cold water, and hot water will be described with reference to FIGS. 2 and 5.

When a signal of extraction of purified water of room temperature is input, the control unit (not illustrated) may control the feed valve V1, the purified water supply valve V2, and the extraction valve V5 to be opened, may control the cold water supply valve V3, the hot water supply valve V4 and the residual water drainage valve 155 to be shut off, and may control the pressurization unit 120 to be driven. Also, the shut-off valve VT may maintain an open state. Accordingly, raw water flowing into the first flow path L1 may pass through the pre-treatment filter 111 and the pressurization unit 120 and may flow into the reverse osmosis membrane filter 113 in a pressurized state. The purified water which has passed through the reverse osmosis membrane filter 113 may pass through the third flow path L3 and the fourth flow path L4, may flow into the post-treatment filter 115 and may be further filtered, and the water may pass through the purified water flow path L6 and the extraction valve V5 and may be provided to a user through the extraction unit 160.

Also, when a signal of extraction of cold water is input, the control unit (not illustrated) may control the feed valve V1, the cold water supply valve V3, the extraction valve V5 to be opened, may control the purified water supply valve V2, the hot water supply valve V4 and the residual water drainage valve 155 to be shut off, and may control the pressurization unit 120 to be driven. Also, the shut-off valve VT may maintain an open state. Accordingly, raw water flowing into the first flow path L1 may pass through the pre-treatment filter 111 and the pressurization unit 120 and may flow into the reverse osmosis membrane filter 113 in a pressurized state. The purified water passing through the reverse osmosis membrane filter 113 may pass through the third flow path L3 and the fourth flow path L4, may flow into the post-treatment filter 115, and may be further filtered, and thereafter, the water may flow into the cold water generation unit 130 through the cold water flow path L7, may be cooled, may pass through the extraction valve V5, and may be provided to a user through the extraction unit 160.

Also, when a signal of extraction of hot water is input, the control unit (not illustrated) may control the feed valve V1, the hot water supply valve V4, and the extraction valve V5 to be opened, may control the purified water supply valve V2, the cold water supply valve V3 and the residual water drainage valve 155, and may control the pressurization unit 120 to be driven. Also, the shut-off valve VT may maintain an open state. Accordingly, raw water flowing into the first flow path L1 may pass through the pre-treatment filter 111 and the pressurization unit 120 and may flow into the reverse osmosis membrane filter 113 in a pressurized state. The purified water passing through the reverse osmosis membrane filter 113 may pass through the third flow path L3 and the fourth flow path L4, may flow into the post-treatment filter 115 and may be further filtered, and thereafter, the water may flow into the hot water generation unit 140 through the hot water flow path L8, may be heated, may pass through the extraction valve V5, and may be provided to a user through the extraction unit 160.

Also, concentrated water not passing through the reverse osmosis membrane filter 113 at the time of extraction of purified water of room temperature, cold water, and hot water may pass through the concentrated water flow path LL of the drainage flow path LD illustrated in FIGS. 2 and 5 and may be drained. In this case, in the case of the embodiment in FIG. 5 including the flushing flow path LF, the flushing valve VF may be closed such that the concentrated water may be drained only through the concentrated water flow path LL, but by opening the flushing valve VF, the concentrated water not passing through the reverse osmosis membrane filter 113 may pass through the concentrated water flow path LL and the flushing flow path LF of the drainage flow path LD and may be drained.

Also, when the extraction of each of the purified water of room temperature, cold water, and hot water is finished, the control unit may block the supply of raw water by shutting off the valves such as the feed valve V1 and may stop driving of the pressurization unit 120.

In the description below, a flow of water in the case of draining the residual water in the extraction unit 160 will be described with reference to FIGS. 3 and 6.

The control unit (not illustrated) may be configured to control the valves to be open and closed such that residual water may be drained automatically or by inputting a residual water drainage signal from a user when a predetermined condition such as the condition in which a predetermined standby time has elapsed after extraction of the extraction unit 160 is finished is applied.

In this case, the control unit may control the feed valve V1, the purified water supply valve V2, the cold water supply valve V3, the hot water supply valve V4 to maintain a closed state, and may control the pressurization unit 120 to maintain a stopped state, may switch the flow path for the extraction valve V5 to connect the extraction unit 160 to the residual water discharge flow path 151, and may control the residual water drainage valve 155 to be in an open state.

Since the flow path between the extraction unit 160 and the reverse osmosis membrane filter 113 is open, the residual water remaining in the extraction unit 160 may pass through the residual water discharge flow path 151 and the purified water discharge flow path L3 and may flow into the filtration side S1 of the reverse osmosis membrane filter 113 by a suction force acting toward the non-filtration side S2 due to an osmosis phenomenon of the reverse osmosis membrane filter 113, and thereafter, the water on the filtration side S1 may flow to the non-filtration side S2 through the reverse osmosis membrane MB and may be drained through the drainage flow path LD.

In this case, in the case of the embodiment illustrated in FIG. 3, since the drainage flow path LD includes only the concentrated water flow path LL, the water on the non-filtration side S2 may be discharged through the concentrated water flow path LL.

Meanwhile, in the case of the embodiment in FIG. 6 including the flushing flow path LF, the water flowing into the non-filtration side S2 by opening the flushing valve VF may pass through the concentrated water flow path LL (the arrow ② in FIG. 6) and the flushing flow path LF (the arrow ① in FIG. 6) of the drainage flow path LD and may be drained. However, in the embodiment in FIG. 6, the flushing valve VF may be blocked, and in this case, the water flowing into the non-filtration side S2 may only be drained through the concentrated water flow path LL (the arrow ② in FIG. 6) of the discharge flow path LD.

While the embodiments have been illustrated and described above, it will be apparent to those skilled in the art that modifications and variations could be made without departing from the scope of the present disclosure as defined by the appended claims.

The invention claimed is:

1. A water purifier, comprising:
a filter unit including a reverse osmosis membrane filter configured to filter incoming water;
an extraction unit configured to provide purified water filtered by the filter unit to a user; and
a residual water drainage unit configured to, after extraction through the extraction unit is finished, drain residual water remaining in the extraction unit through the reverse osmosis membrane filter using an osmotic phenomenon of the reverse osmosis membrane filter;
a purified water discharge flow path through which purified water filtered by the reverse osmosis membrane filter is discharged; and
a drainage flow path through which concentrated water not filtered by the reverse osmosis membrane filter is discharged are connected to a rear end of the reverse osmosis membrane filter;
wherein the residual water drainage unit includes a residual water drainage flow path connecting the extraction unit to the purified water discharge flow path, and
wherein the residual water in the extraction unit flows into the reverse osmosis membrane filter through the residual water drainage flow path and the purified water discharge flow path by an osmosis phenomenon of the reverse osmosis membrane filter, and is drained through the drainage flow path;
the extraction unit is connected to an extraction valve for extracting purified water;
the residual water drainage unit further includes a residual water drainage valve installed in the residual water drainage flow path and opened during an operation of draining the residual water, and
the extraction valve is configured to include a plurality of unit valves in a complex manner to perform a function of extracting purified water and a connection function between the extraction unit and the residual water drainage flow path.

2. The water purifier of claim 1,
wherein the residual water drainage flow path connects the extraction valve to the purified water discharge flow path.

3. The water purifier of claim 2, wherein the extraction valve is configured to operate to connect the extraction unit to the residual water drainage flow path when the residual water is drained.

4. The water purifier of claim 1, wherein the residual water drainage valve is configured to be opened for a predetermined operation time to discharge the residual water.

5. The water purifier of claim 4, wherein the residual water drainage valve is configured to open after a predetermined standby time is elapsed after extraction of the extraction unit is finished.

6. The water purifier of claim 1, wherein the residual water drainage unit further includes a non-return valve installed in the residual water drainage flow path and configured to prevent backflow of water from the purified water discharge flow path in a direction of the extraction unit.

7. The water purifier of claim 1,
wherein the drainage flow path includes a concentrated water flow path through which concentrated water not filtered by the reverse osmosis membrane filter is discharged, and a flushing flow path for flushing the reverse osmosis membrane filter, and
wherein a flushing valve configured to open the flushing flow path when the reverse osmosis membrane filter is flushed is installed in the flushing flow path.

8. The water purifier of claim 7, wherein the flushing valve is configured to be open when the residual water is drained.

* * * * *